United States Patent
Yee

(10) Patent No.: US 8,090,800 B2
(45) Date of Patent: Jan. 3, 2012

(54) METHOD AND SYSTEM FOR AUTOMATED WEB PAGE ACCESSIBILITY CODING STANDARDS ANALYSIS

(75) Inventor: David Randall Yee, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1059 days.

(21) Appl. No.: 10/146,099

(22) Filed: May 14, 2002

(65) Prior Publication Data

US 2009/0113287 A1   Apr. 30, 2009

(51) Int. Cl.
  *G06F 15/16*   (2006.01)
  *G06F 3/00*    (2006.01)
  *G06F 17/00*   (2006.01)

(52) U.S. Cl. ........ 709/219; 715/865; 715/731; 715/729; 715/201; 715/202; 715/234; 715/205; 715/235; 709/203

(58) Field of Classification Search .......... 704/258–278; 715/731, 865, 201–202, 234, 237, 205–208, 715/729, 747, 744, 760, 235; 709/202, 203, 709/224, 217–219
See application file for complete search history.

(56) References Cited

U.S. PATENT DOCUMENTS

| | | | | |
|---|---|---|---|---|
| 6,029,182 A * | 2/2000 | Nehab et al. | ................... | 715/523 |
| 6,138,157 A * | 10/2000 | Welter et al. | ................... | 709/224 |
| 6,324,511 B1 * | 11/2001 | Kiraly et al. | ................... | 704/260 |
| 6,470,383 B1 * | 10/2002 | Leshem et al. | ................. | 709/223 |
| 6,665,642 B2 * | 12/2003 | Kanevsky et al. | ............ | 704/260 |
| 6,714,963 B1 * | 3/2004 | Levine et al. | .................. | 709/203 |
| 6,792,475 B1 * | 9/2004 | Arcuri et al. | ................... | 709/245 |
| 6,959,326 B1 * | 10/2005 | Day et al. | ...................... | 709/217 |
| 7,058,887 B2 * | 6/2006 | Cragun | ......................... | 715/243 |
| 7,162,526 B2 * | 1/2007 | Dutta et al. | .................... | 709/229 |
| 7,216,298 B1 * | 5/2007 | Ballard et al. | ................ | 715/760 |
| 2002/0103914 A1 * | 8/2002 | Dutta et al. | .................... | 709/229 |
| 2002/0156799 A1 * | 10/2002 | Markel et al. | ................. | 707/202 |
| 2003/0187724 A1 * | 10/2003 | Litwiller et al. | ................ | 705/11 |
| 2004/0148568 A1 * | 7/2004 | Springer | ....................... | 715/513 |
| 2009/0113287 A1 * | 4/2009 | Yee | .............................. | 715/234 |

OTHER PUBLICATIONS

Cast, Bobby, Apr. 7, 2002, http://web.archive.org/web/20020202032250/www.cast.org/bobby/, pp. 1-11.*
Bohman, Paul R., WebAIM Section 508 Checklist, http://www.webaim.org/standards/508/checklist, Mar. 29, 2001, pp. 1-7.*

* cited by examiner

*Primary Examiner* — Gregory Todd
(74) *Attorney, Agent, or Firm* — Kilpatrick Townsend & Stockton LLP

(57) ABSTRACT

A method and system for automated accessibility checking of Web pages. The method includes the step of accessing a Web page using a parser to generate data corresponding to the components of the Web page. The data is analyzed using an analysis engine to determine compliance of the components of the Web page with a set of accessibility standards. The results of the analysis performed by the analysis engine are subsequently stored. The results are then provided to indicate a degree of compliance with the set of accessibility standards. The method for automated accessibility checking can be implemented as a hosted application residing on a network connected server.

9 Claims, 8 Drawing Sheets

METHOD AND SYSTEM FOR AUTOMATED WEB PAGE ACCESSIBILITY CODING STANDARDS ANALYSIS

FIELD OF THE INVENTION

The field of the present invention pertains to checking adherence to coding standards adopted under Section 508 of the Federal Rehabilitation Act. More particularly, the present invention relates to a method and system for efficiently verifying that static and dynamically generated web pages and electronic documents have been coded to Section 508 standards.

BACKGROUND OF THE INVENTION

In 1973, the United States legislature passed the Workforce Rehabilitation Act. On Aug. 7, 1998, an amendment to the workforce rehabilitation act, commonly referred to as "Section 508", was signed into law by President Clinton. Section 508 requires that electronic and information technology developed or purchased by the Federal Government be accessible to people with disabilities. Section 508 establishes both non-binding guidelines for technology accessibility and binding, enforceable standards that will be incorporated into the Federal Procurement procedures. In addition to providing for enforceable standards, the amended Section 508 establishes a complaint procedure and reporting requirements to encourage compliance.

The binding and non-binding guidelines of Section 508 were put into place in order to leverage the magnitude of federal purchasing power to promote competition in the technology industry by clarifying the Federal market's requirement for accessibility in products intended for general use. Section 508 requires Federal agencies to purchase electronic and information technology that is accessible to employees and members of the public who are disabled. For example, under the Section 508 procurement regulations, this means that if two companies are bidding a government contract and only one is offering accessible solutions, the acquiring agency is required to purchase the accessible technology.

Basically, information technology products are "accessible" if they can be used as effectively by people with disabilities as by those without. Section 508 required that an ADA "Access Board" establish standards for accessibility. The Access Board in turn established an Electronic and Information Technology Access Advisory Committee (EITAAC) in October of 1998. The EITAAC was composed of representatives from industry, academics, government and disability advocacy organizations and was charged with developing standards for accessible electronic and information technology.

With respect to software applications and Web browsing, standards developed by the EITAAC include so-called functional standards that require, for example, there be a way for a person who is mobility impaired or blind to use a given information technology product or Web site. Additionally, the developed standards require a given Web site to satisfy a list of specific items for Web accessibility. The specific items need to be implemented during Web site development to ensure that a person who is mobility impaired or blind, for example, can use the Web site. Examples of such specific items include a requirement for using alternative text for images and using client side image maps instead of server side maps. These are fairly simple and clear requirements. However, other requirements are not so straightforward, and can be subject to differing interpretations.

Hence, there exists a problem with specific definition of Section 508 coding standards. Some of the standards can be vague and subject to interpretation. This is especially so in the case of Web site designers having limited experience with the applicable accessibility rules. Usually, when it comes to the actual the detailed coding implementation of the Web pages themselves, the rules are often not sufficiently definite. In many cases, there is nothing hard and concrete that specifically says "this is how the HTML code must be implemented" to guide the Web page authors. Accordingly, the rules are subject to interpretation.

One prior art approach to solve this problem involves the use of accessibility "experts" which review the HTML coding of the Web pages of a Web site and grade their degree of compliance with the accessibility standards. When violations of the standards are found, the experts can suggest or implement methods to correct the violations. This approach has a disadvantage of being expensive and slow, since the expert reviews the Web pages after they have been encoded. Many Web sites can include hundreds of Web pages. Furthermore it is a visual analysis subject to human error.

Another prior art approach to solve this problem involves the use of software-based accessibility checking tools as opposed to an actual human expert. The Web site authors use the tools to check compliance of the Web pages of the Web site with the accessibility standards. These tools are often limited in their effectiveness in that they typically process one Web page at a time. Additionally, these prior art tools typically process constituent files of the Web page as opposed to an entire Web site. Thus, prior art software-based accessibility checking is excessively slow. Prior art also does not account for capturing all information required to generate dynamic web pages, such as cookies that are used for authentication. As such, the prior art cannot reach and therefore cannot analyze much of what is provided in dynamic web applications.

Thus, what is required is an automated accessibility checking system that can assist Web site authors in ensuring the Web pages of their Web site conform to accessibility standards of the law. Additionally, the required solution should be efficiently implemented and capable analyzing entire Web pages. The present invention provides a novel solution to the above requirements.

SUMMARY OF THE INVENTION

Embodiments of the present invention comprise a method and system for automated Web page accessibility coding standards analysis. Embodiments of the present invention provide an automated accessibility coding standards checking system that can assist Web site authors in ensuring the Web pages of their Web site are properly coded. Additionally, embodiments of the present invention are efficiently implemented and capable of analyzing entire Web sites.

In one embodiment, the present invention is implemented as a server hosted software-based method for automated accessibility coding standards checking of Web pages. The software-based method resides on a network connected server (e.g., a Web application). The method includes the step of accessing a Web page via the HyperText Transfer Protocol (HTTP), and using a parser to generate data corresponding to the components of the Web page. The data is analyzed using an analysis engine to determine coding standards adherence of the components of the Web page with a set of coding standards rules. The results of the analysis performed by the analysis engine are subsequently stored. The results are then provided to indicate known or suspected accessibility coding standards violations.

In other embodiments, the analysis engine can be optionally configured to automatically access a plurality of Web pages comprising a Web site. The analysis engine can optionally access each of the Web pages that link to a URL referenced by a given Web page, a method commonly known as "crawling".

In another embodiment, the parser is configured to generate a tree data structure corresponding to the components of the Web page, wherein the tree data structure is configured for use by the analysis engine to generate the result. The parser can also be configured to perform a plurality of passes on the Web page to generate the data corresponding to the components of the Web page.

In this manner, embodiments of the present invention allow a user to enter a URL of a given Web site and analyze a page, or group of pages, for accessibility coding standards violations. This is advantageous since Web pages as presented by a Web browser are representative of what a user actually sees. Embodiments of the present invention are extensible because additional rules or standards can be added to the set of accessibility standards as required. Rules can be added and turned on or off at analysis time. Embodiments of the present invention can be configured to store analysis results in a database, thereby allowing a user to post-process results and thereby perform a higher degree of business analysis. Additionally, embodiments of the present invention implement a web crawling capability that automatically navigates down into sub-links. This saves users from doing individual page analysis.

In another embodiment, an HTTP proxy examiner is provided. In this embodiment, a user's web browser directly contacts the HTTP proxy examiner (e.g., a proxy server) to indirectly contact a web site and download a web page. The proxy examiner is used to analyze the constituent components comprising the Web site. The proxy examiner is used to analyze and perform those functions which may not otherwise be accessible. In this manner, embodiments of the present invention allow a user to navigate to a Web site as they normally would, indirectly causing analysis to occur and indirectly causing analysis results to be stored in a database

BRIEF DESCRIPTION OF THE DRAWINGS

The present invention is illustrated by way of example and not by way of limitation, in the Figures of the accompanying drawings and in which like reference numerals refer to similar elements and in which.

DETAILED DESCRIPTION OF THE INVENTION

Figure 1:
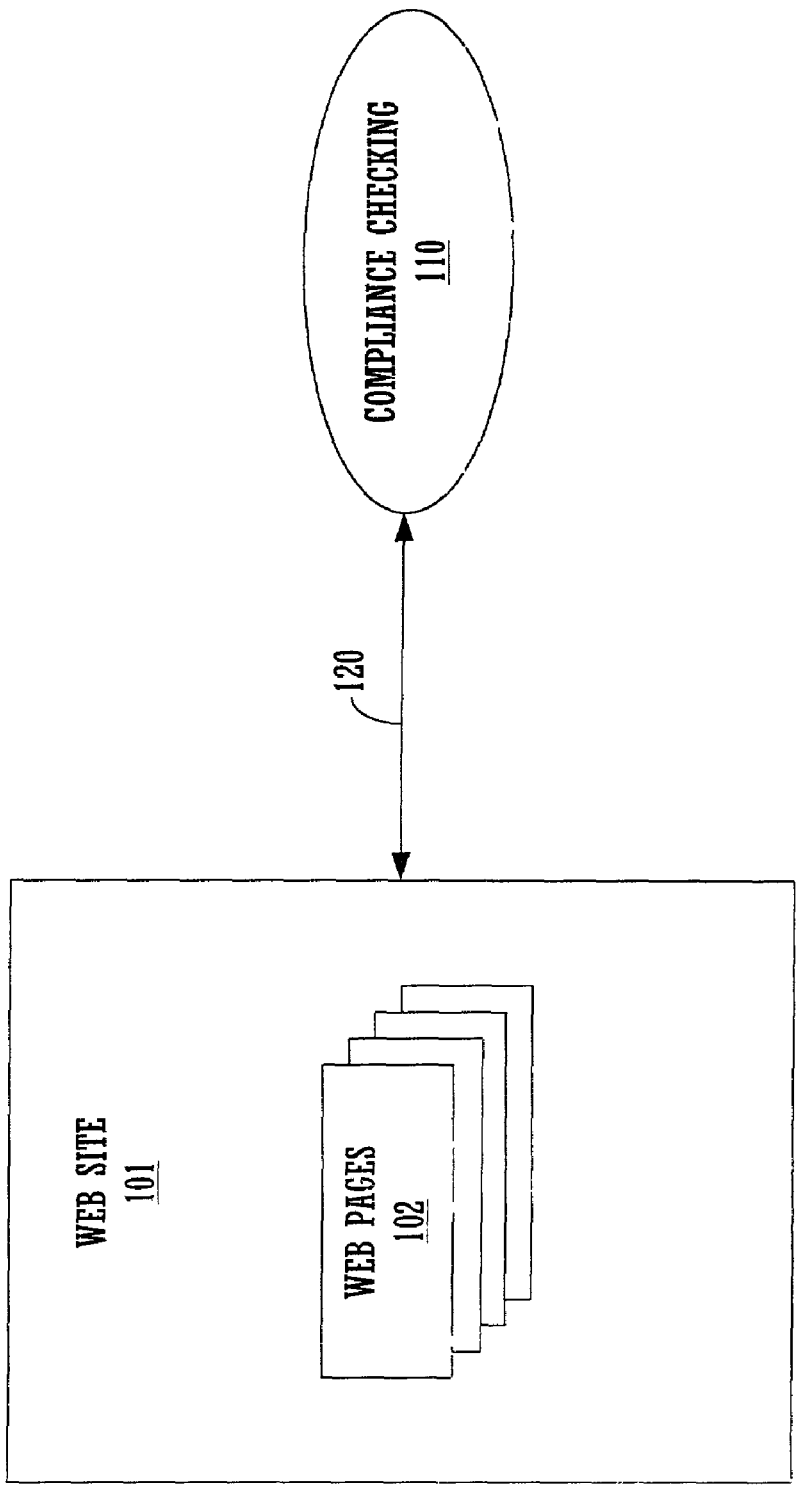
FIG. 1 shows an overview diagram of an automated Web page accessibility coding standards analysis system in accordance with one embodiment of the present invention.

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Embodiments of the present invention comprise a method and system for automated Web page accessibility coding standards analysis. Embodiments of the present invention provide an automated accessibility checking system that can assist Web site authors in ensuring the Web pages of their Web site compliant with accessibility standards of the law. Additionally, embodiments of the present invention are efficiently implemented and capable analyzing entire Web pages. The method and system of the present invention and its benefits are further described below Notation and Nomenclature Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "communicating" or "instantiating" or "registering" or "displaying" or the like, refer to the action and processes of a computer system (e.g., computer system 512 of FIG. 5), or similar electronic computing device, that manipulates and transforms data represented as physical (electronic) quantities within the computer system's registers and memories into other data similarly represented as physical quantities within the computer system memories or registers or other such information storage, transmission or display devices.

Method and System of the Invention

FIG. 1 shows an overview diagram of an automated Web page accessibility coding standards analysis system 100 in accordance with one embodiment of the present invention. As shown in FIG. 1, system 100 includes a Web site 101 having a plurality of Web pages 102. An accessibility coding standards checking system 110 is coupled to the Web site 101 via a network communications link 120 (e.g., Internet, intranet, etc.).

System 100 of the present embodiment comprises a system for automated Web page accessibility coding standards analysis. The accessibility coding standards checking system 110 is configured to provide an automated accessibility coding standards checking system that can assist the authors of Web site 101 ensure the Web pages 102 are properly coded for accessibility. System 110 is efficiently implemented and capable of analyzing the Web pages 102 in their entirety.

In one embodiment, the accessibility coding standards checking system 110 is implemented as a server hosted software-based method for automated accessibility checking of Web pages. In such an embodiment, the software-based functionality of system 110 resides on a network connected server (e.g., Web application). Alternatively, in another embodiment, the accessibility coding standards checking system 110 is implemented as a client hosted software-based method.

The system 110 accesses one or more of Web pages 102 to determine coding standards of the components of the one or more Web pages 102 with a set of accessibility standards. The results are then provided to a user to indicate a degree of coding standards with the set of accessibility standards. The Web pages 102 can be accessed automatically, as in a case where the Web pages 102 are commonly linked through one or more URLs. For example, a user can enter a homepage of the Web site 101 into the coding standards checking system 110 for analysis, and based on this homepage, system 110 can analyze all linked pages 102 of Web site 101.

It should be noted that embodiments of the present invention are directed towards ensuring compatibility with coding standards as determined by the Access Board for Section 508 of the Workforce Reinvestment Act of 1998. Embodiments of the present invention function by assisting Web site designers in ensuring their respective Web sites conform to the coding standards. As known by those in the art, beginning in June of 2001, government Web sites are required to conform to these standards. More particularly, contractors doing Web development for the Federal government are required to conform to these standards. Accordingly, companies doing business with the Federal government or with states receiving technical assistance funds (Tech Act states) are required to put forth an accessible Web presence.

For additional descriptions of the accessibility standards, readers are directed to the full set of Section 508 final standards available on the Access Board Web site at http://www.access-board.gov/news/508-final.htm. The specific standards for the Web are in §1194.22 of that document entitled "Web-based Intranet and Internet Information and Applications."

Figure 2:
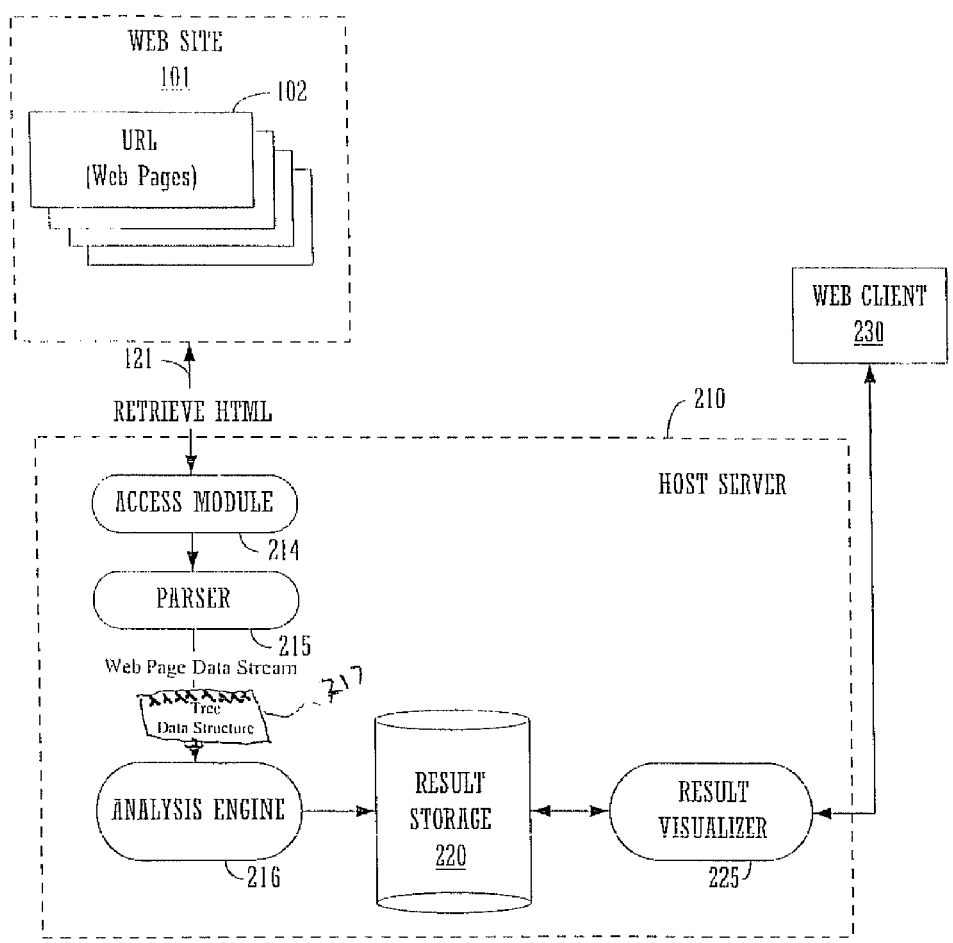
FIG. 2 shows a more detailed diagram of an accessibility coding standards checking system in accordance with one embodiment of the present invention.

FIG. 2 shows a diagram of an accessibility coding standards checking system 200 in accordance with one embodiment of the present invention. Diagram 200 shows a more detailed depiction of a coding standards checking system. As depicted in FIG. 2, system 200 shows a Web site 101 including a plurality of Web pages 102. A host server 210 is shown. Included within the host server 210 are an HTTP access module 214, a parser 215, an analysis engine 216, a storage unit 220, and a result visualizer 225. The host server 210 is coupled to a Web client 230.

Host server 210 of the present embodiment functions by implementing a method for automated accessibility checking of the Web pages (e.g., Web pages 102) of a Web site (e.g., Web site 101). Analysis is initiated by a user entering one or more URLs of Web pages requiring analysis, in this case Web pages 102. Based on the entered URL, the access module 214 accesses the Web pages 102 and generates a Web page data stream corresponding to the components of the Web page. The data stream is passed to the parser 215. In this embodiment, the parser 215 functions by pulling apart the components of an HTML page for subsequent analysis. The components of the HTML page included, for example, tags, images, scripts, text strings, and the like. The components are presented to the analysis engine 216 as a Web page data stream.

In one embodiment, the parser 215 is configured to generate a tree data structure 217 corresponding to the components of each Web page. The tree data structure 217 is configured for use by the analysis engine. Once built, the tree data structure 217 includes all the information about the components of a Web page, and the information is in a form that allows the analysis engine to quickly access and apply the various rules of the accessibility standards. The tree data structure 217 allows the analysis engine to flag components of the Web page that are not coded to standards or that are at risk of causing accessibility problems.

In another embodiment, the parser 215 is configured to perform a plurality of passes on each Web page in order to generate the data corresponding to the components of the Web page. For example, a first pass is used to break down the more basic components of a Web page and analyze the more straightforward components. The second pass, and subsequent passes, are used to break down the more complex components of a Web page. This data is sent to the analysis engine 216 as the Web page data stream.

The Web page data stream, comprising the data corresponding to the components of the Web pages, is analyzed by analysis engine 216 to determine compliance of the components of the Web page with a set of accessibility standards. For example, the analysis engine 216 is configured to look at each one of the tags received in the Web page data stream and knows what rules to apply and how to apply them to determine whether the tags are compliant. Similarly, as an example, the analysis engine 216 looks at each of the graphics images to determine whether alternative text has been supplied. As described above, these rules are defined by Section 508 coding standards.

It should be noted that the set of rules is user customizable. Rules can be configured to be analyzed individually, or analyzed in a group. For example, a user can configure a particular rule to be analyzed by itself in order to eliminate any possible interactions with the analysis of other rules. (E.g., check all tags for compliance).

The storage unit 220 functions by storing the results of the analysis performed by the analysis engine 216. In this embodiment, the storage unit 220 comprises a database maintained by the host server 210. The results of the analysis are stored into the database. This allows easy access and analysis at a later time. The results can be indexed with respect to which page generated the results, which URL generated the results, Web site, or the like. The results can also be indexed with respect to which type of error is generated, alternative text attributes, etc. Additionally, violations can be categorized with respect to whether a particular violation is a violation of Section 508, or some other set of HTML analysis rules. For example, the rule set can be extended to take into account general HTML coding rules, or other accessibility rules that might be established by the Worldwide Web Consortium (W3C) in their Web Content Accessibility Guidelines (WCAG).

The result visualizer 225 functions by accessing the data stored within result storage unit 220 and packaging the data in order to subsequently provide the data to the Web client 230 (and thus the user). In this embodiment, the data is packaged in order for display on a Web browser of the client 230 (e.g., HTML formatted). For example, the results can be provided in such manner as to indicate a degree of compliance with the set of accessibility standards. A result presentation can be rendered in order to graphically depicted the degree of compliance. The result presentation can be, for example, a graph showing the number of errors found, the type of errors found, and the like. The result presentation is provided to the Web client using Web based standards (e.g., HTML).

The result visualizer 225 accesses this stored result information and presents the information to the user and easily understood easily readable form. For example, the result visualizer 225 can indicate where the violations occurred and allow a user to click on the specific violation and be taken directly to the point in the Web page or the point in the actual HTML code which led to the violation. Explanations as to why the code may or does violate standards can also be provided. Short version can be provided or a long version can be provided. Examples of the correct code can be can provided. Links to more detailed explanation material can be provided (e.g., to more authoritative manuals).

Figure 3:
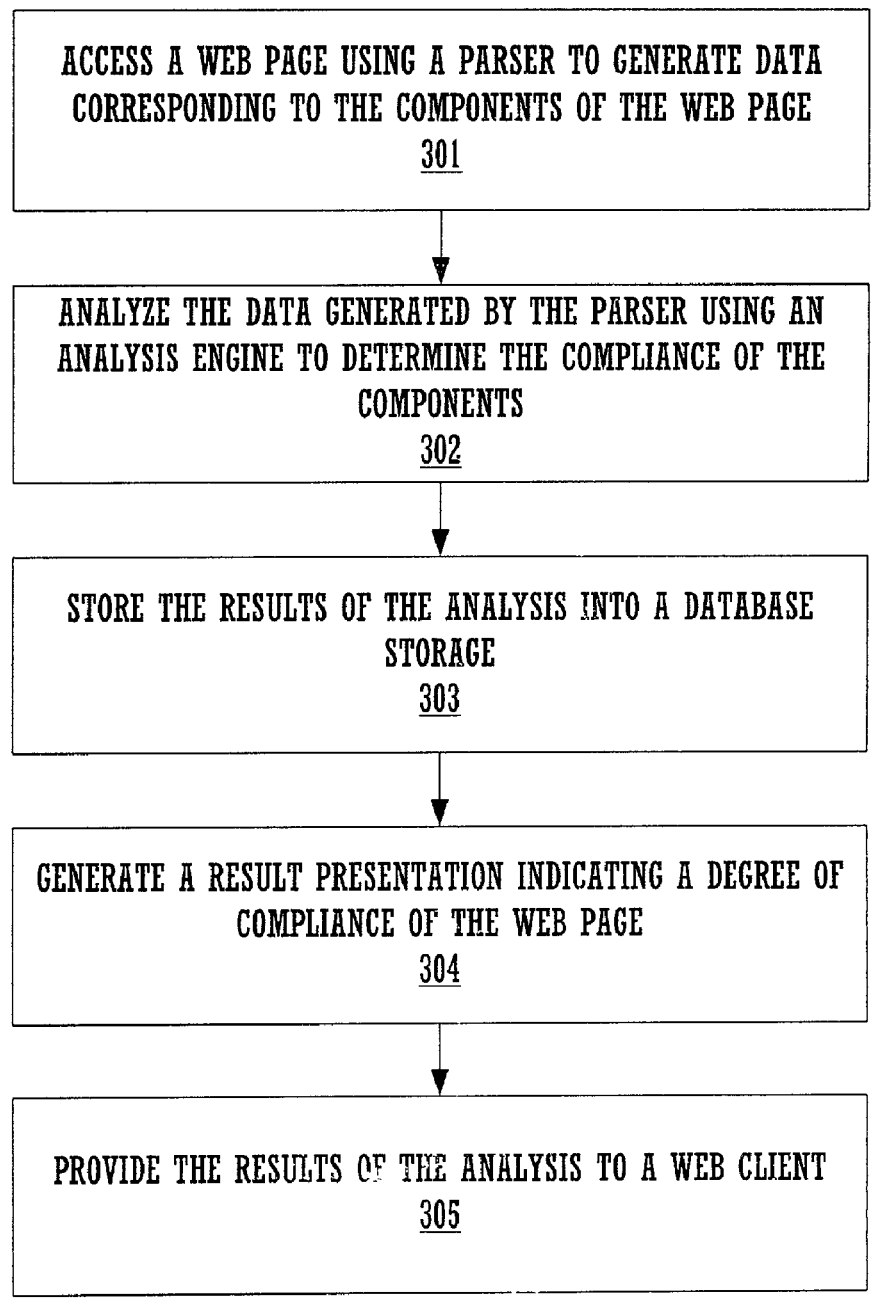
FIG. 3 shows a flowchart of the steps of a process in accordance with one embodiment of the present invention.

FIG. 3 shows a flowchart of the steps of a process 300 in accordance with one embodiment of the present invention. As depicted in FIG. 3, process 300 shows the steps of a server hosted accessibility coding standards analysis system (e.g., system 210 of FIG. 2) as it analyzes the Web pages of a Web site.

Process 300 begins in step 301 where a Web page (e.g., one of Web pages 102 of FIG. 2) is accessed using an HTTP access module (e.g., access module 214), and the stream is passed to a parser (e.g., parser 215) to generate data corresponding to the components of the Web page. In step 302, the data generated by the parser is analyzed using an analysis engine (e.g., analysis engine 216) to determine whether the components of the Web page are properly coded according to a set of accessibility coding standards. As described above, the analysis engine analyzes each of the Web page components, such as, for example, the tags, the graphics images, the text strings, the scripts, and the like for proper coding with respect to the accessibility coding standards.

Referring still to process 300 of FIG. 3, in step 303, the results of the analysis engine are stored using a database (e.g., the storage unit 220). As described above, storage within a database facilitates subsequent review and analysis at later times by other users. In step 304, a result presentation is generated indicating a degree of coding standards compliance with the set of accessibility standards used by the analysis engine. The result presentation can be generated using a result visualizer (e.g., result visualizer 225). Subsequently, in step 305, the results are provided to a Web client (e.g., Web client 230) for review by a user through a Web browser.

Figure 4:
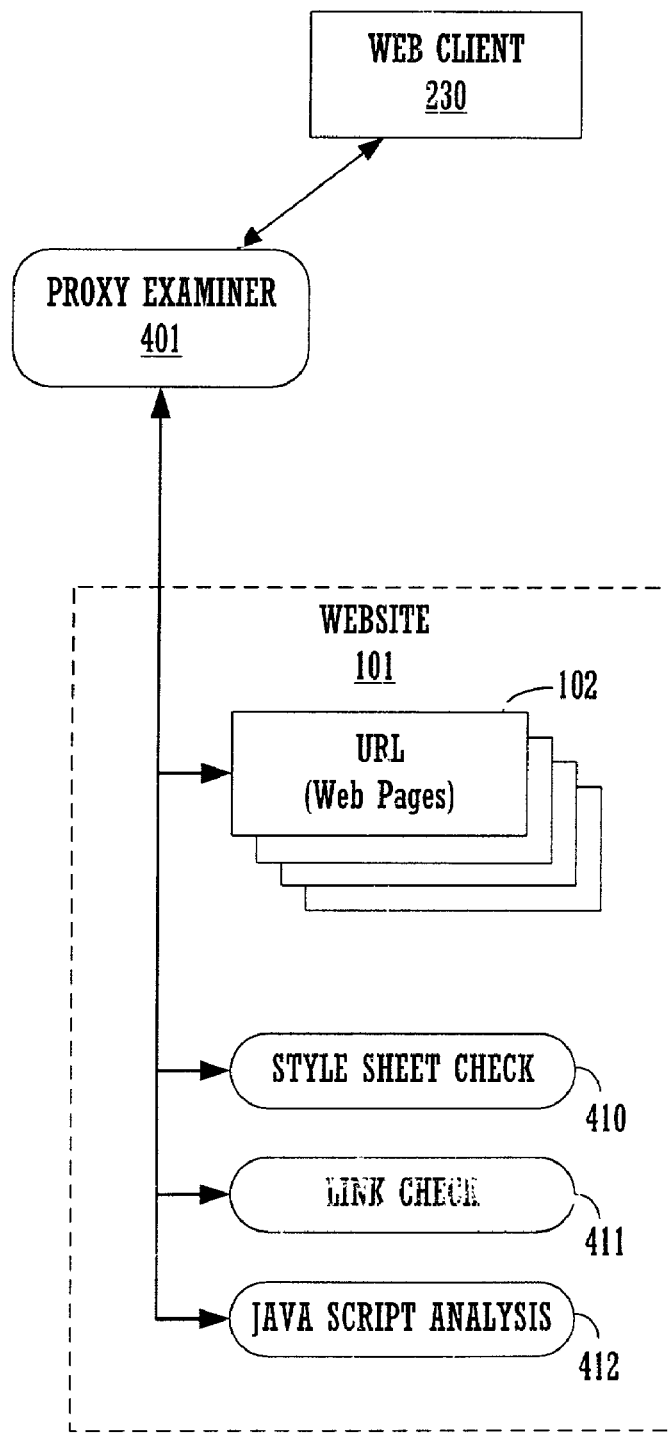
FIG. 4 shows a diagram of a proxy examiner system in accordance with one embodiment of the present invention.

FIG. 4 shows a diagram of a proxy examiner system 400 in accordance with one embodiment of the present invention. As depicted in FIG. 4, Web client 230 is coupled to a proxy examiner 401. The proxy examiner 401 is used to analyze the constituent components comprising the Web site 101. The proxy examiner 401 is used to analyze and perform those functions which may not be accessible to the parser 215 or the analysis engine 216 (shown in FIG. 2). Three of such functions are shown as style sheet checking 410, link checking 411, and JavaScript analysis 412.

In the present embodiment, proxy examiner 401 is used where the Web crawling system as described above is inadequate. An example would be in a case where a log-in is required in order to access Web pages. The Web crawling system 200 described above may have difficulty functioning with data input pages, such as log-in pages. The Web crawling system 200 may have difficulty functioning with "cookies" wherein log-in information is placed upon client's hard drives. The proxy examiner 401 can function as an agent capable of dealing with data input pages, such as log-in pages, and dealing with cookies.

In one embodiment, Proxy examiner 401 intercepts and passes through the HTTP communication from a browser to a web server and back. In one example, the first step a user takes is to get a "run ID" cookie from the proxy examiner 401. The cookie is stored on the client 230 browser with a set duration. Then, the user sets their HTTP Proxy of their browser to point to proxy examiner 401. From that point onward, the proxy examiner 401 receives an HTTP request from a client browser, and pulls out the "run ID" cookie value. It then passes the request along to the targeted Web Server 101, and receives HTML along with any HTTP headers as part of the standard HTTP protocol. It forwards all the returned HTML and HTTP headers to the client 230 browser but along the way analyzes the HTML for any accessibility violations. Results of analysis are stored in a database (e.g., result storage 220) under the "run ID". The results of the analysis are provided to the result storage unit as a Web page datastream, as shown in FIG. 4. Later, the user can run a report on accessibility analysis results based on the run ID.

Thus, the proxy examiner 401 can get to Web pages that normally would not be available because without cookies set, users would get to the login or error page only. Compared to a manual analysis, this is much more efficient. For example, manual analysis would be the approach where people go to a page, save the HTML, publish it, and analyze it a page at a time. This system just lets a user click from page to page and then go to a report for results.) The manual approach also introduces a security hole. Compared to extending existing analyzers to allow cookie insertion into the HTTP stream, this is better because:
some cookies are not visible since they are only in browser memory, and it automates the cookie acquisition and sending process, reducing error prone manual data entry; and
capturing new cookies as they are generated.

Thus, embodiments of the present invention provide a method and system for automated Web page accessibility coding standards analysis. Embodiment of the present invention provide an automated accessibility checking system that can assist Web site authors in ensuring the Web pages of their Web site compliant with accessibility standards of the law. Additionally, embodiments of the present invention are efficiently implemented and capable analyzing entire Web pages.

Figure 5:
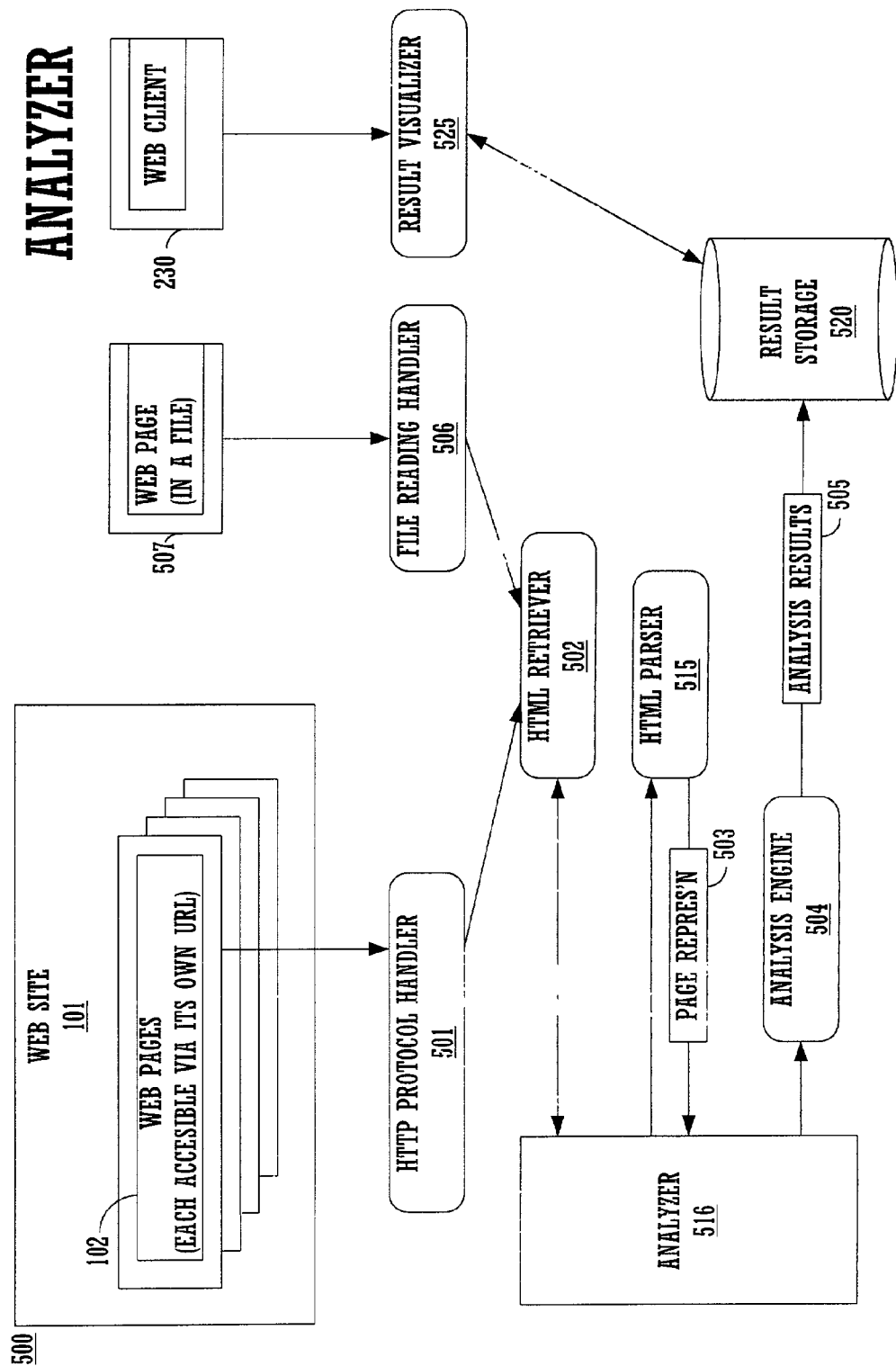
FIG. 5 shows a diagram of a coding standards analysis system in accordance with one embodiment of the present invention.

Referring now to FIG. 5, a diagram of an analysis system 500 in accordance with one embodiment is shown. System 500 shows the components of an analysis system 500 in accordance with an alternative embodiment of the present invention.

The system 500 embodiment shows a more detailed depiction of interactions between analysis system components as Web pages of a Web site are examined with respect to accessibility coding standards. As with system 200 of FIG. 2, the web client 230 makes a request to analyze a Web page, supplying a URL of the page or name of the associated file. The Analyzer 516 causes an HTML Retriever 502 to select either an HTTP Protocol Handler 501 or file reading handler 506 to pull in the identified Web page (e.g., one of Web pages 102 or Web page 507). A resulting data stream from either of these sources is passed to an HTML parser 515. The parser 515 reads HTML from data stream, creating a page representation 503 and feeding results back to the analyzer 516. The analyzer 516 causes the Analysis Engine 504 to process page representation 503. In the present embodiment, the page representation 503 closely matches HTML specifications of the original Web page. The Web page being analyzed is broken down into multiple elements commonly referred to as "tags" and each tag has any number of name-value pairs referred to as "attributes".

The analysis engine 504 applies one or more rules to each HTML element in the page representation 503. As described above, the set of rules is customizable. Each rule processes one or more HTML elements, often analyzing the element's attribute names and values. In some cases, a rule analyzes children or ancestors of an HTML element in a structured hierarchy. If rule violations are found, results (e.g., analysis results 505) are stored in result storage 520 (e.g., a database). The user accesses and reviews the analysis results 505 by accessing a reporting Web page. The reporting Web page starts up a result visualizer 525, generating results of the analysis in visually appealing format.

Figure 6:
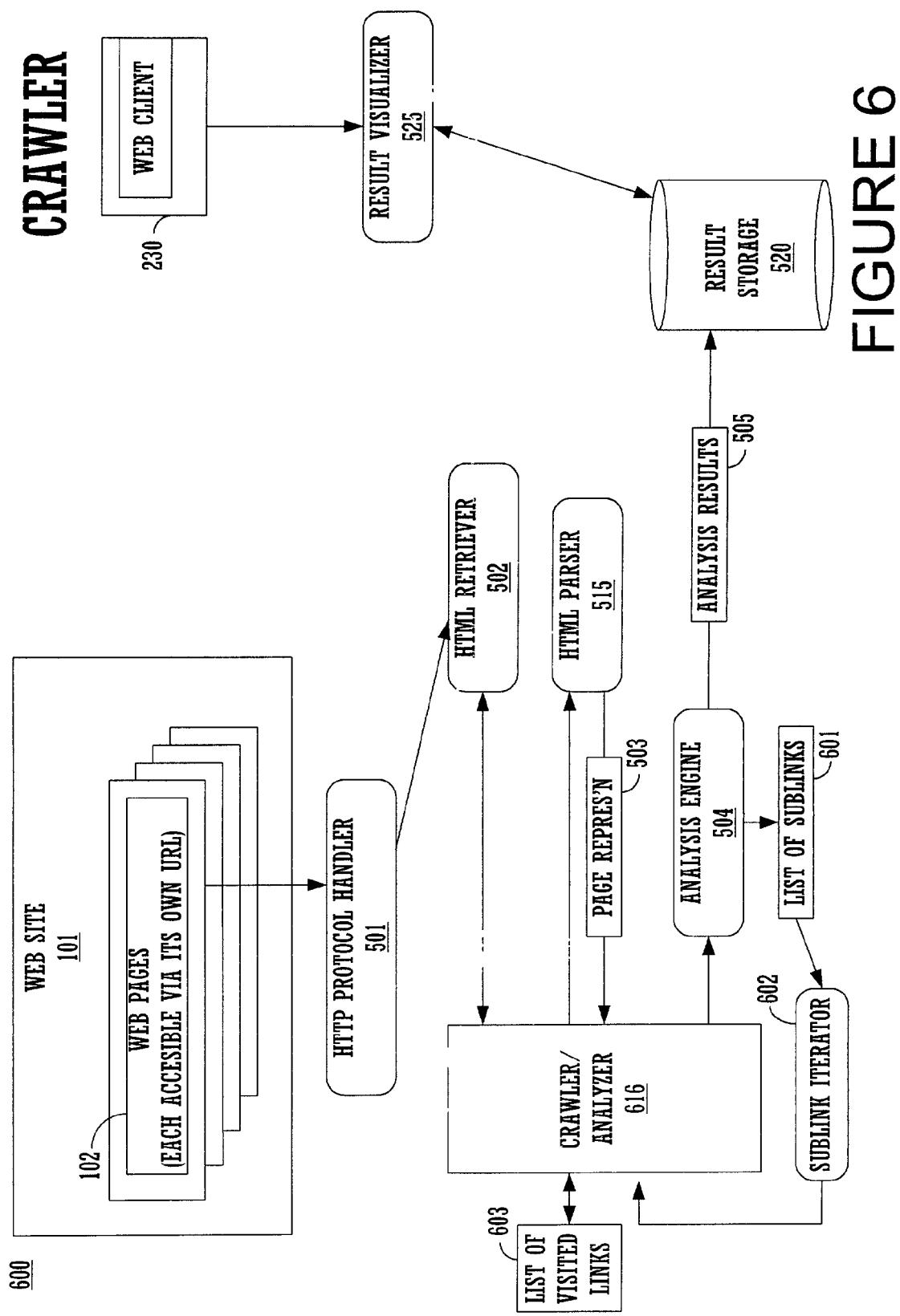
FIG. 6 shows a diagram of a web crawler analysis system in accordance with one embodiment of the present invention.

FIG. 6 shows a diagram of a web crawler analysis system 600 in accordance with one embodiment of the present invention. System 600 shows the components used to implement the web crawling analysis functions of an accessibility standards analysis system (e.g., system 500).

Analysis begins when the Web Client 230 makes request to crawl a web site (e.g., Web site 101), supplying parameters such as top URL, depth of analysis, maximum number of URLs to analyze, and URL limiter. The crawler 616 subsequently visits each Web page specified by the parameters and analyzes it using analysis engine 504 in the manner described above with system 500 of FIG. 5. For each page Crawler 616 visits, state data (e.g., a list of visited links 603) is retained indicating that particular URL has been visited.

During analysis, a list of sublinks 601 is collected. Each of the sublinks 601 are fed through a sublink iterator 602 and sent to Crawler 616 for analysis. The crawler 616 again visits the specified Web page, but first checks to make sure the page hasn't already been visited, as indicated in the list of visited links 603. If the Web page has been visited, the page is not crawled again (to prevent repeated analysis). Analysis results 505, spanning multiple URLs as a result of the Crawl function, are stored in the result storage 520 under a common Run ID. In this embodiment, the result visualizer 525 presents multiple options for viewing the combined data, e.g., most common violation found, all pages analyzed, results for a specific page analyzed, and the like.

Figure 7:
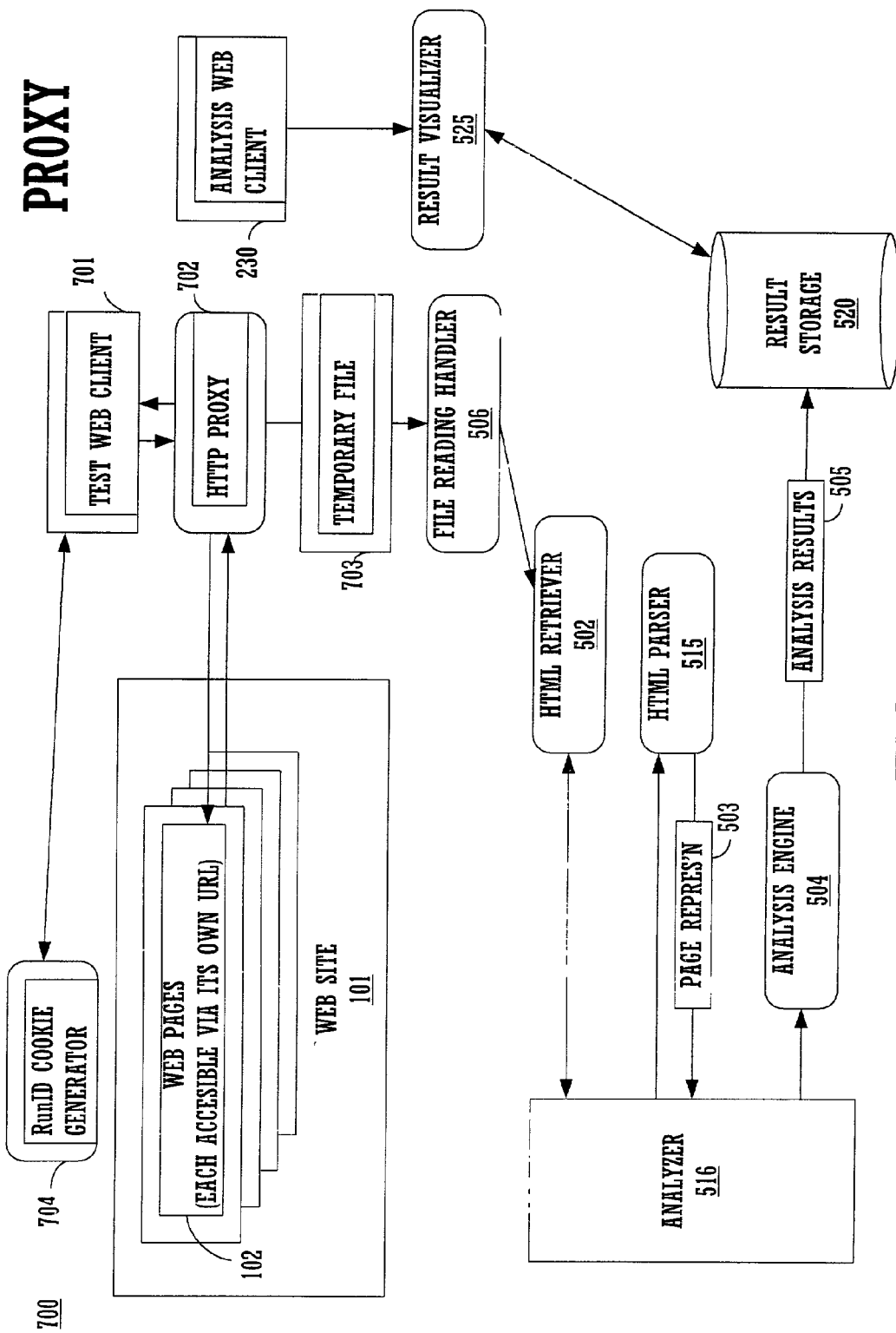
FIG. 7 shows a diagram of a proxy analyzer system in accordance with one embodiment of the present invention.

FIG. 7 shows a diagram of a proxy analyzer system 700 in accordance with one embodiment of the present invention. System 700 shows the components used to implement the proxy analysis functions of an accessibility standards analysis system (e.g., system 500). As with proxy examiner 401 of FIG. 4, the proxy analyzer system 700 is used where a Web crawling system (e.g., Web crawling system 600 of FIG. 6) may be inadequate. The proxy analyzer system 700 is capable of dealing with data input pages, such as log-in pages, and dealing with cookies.

In this embodiment, analysis begins when a user establishes a Run ID by requesting a run ID on Web Client 701 and pulling it from RunID Cookie Generator 704. Also, that same cookie generator stores that run ID in Result Storage 520 for later referencing via 230 (effectively making an empty holding bin for any results stored from results 505 into storage 520). The Test Web Client 701 then requests one of Web pages 102. The browser of Web client 701 (e.g., MSIE) sends request to an HTTP proxy 702 based on browser configuration. The requested URL, plus cookie, are sent to the proxy 702. The proxy 702 then contacts the URL requested, and pulls HTML from it. The proxy 702 both returns a data stream from target URL to the web client 701, and saves output to a temporary file 703. After returning stream of data to client 701, the proxy 702 tells the analyzer 516 to analyze the given temporary file 703, and store results in the result storage 520 under the run ID 704 (specified by the cookie). It should be noted that the above analysis is not done when a duplicate hit is found. A duplicate hit is defined as a Web page having all the same characteristics as a prior Web page, including URL and any form parameters.

After requesting the Run ID, the user of the Test Web Client 701 is presented with the cookie (e.g., in the form of a number and a hyper link) which can be used to access and view the results. The user view at the Test Web Client 701 is that of a normal web page, so user continues to click or navigate to web pages as usual. Subsequently, the RunID cookie expires. At any point after analysis results 505 are generated, a user can start up a separate browser at the Analysis Web Client 230 (e.g., Netscape) on same or separate client machine, and view results of analysis. The analysis results 505 may expand with each click performed by the user of Test Web Client 701 until the cookie RunID cookie has expired or a new RunID is established by the user.

Computer System Platform

Figure 8:
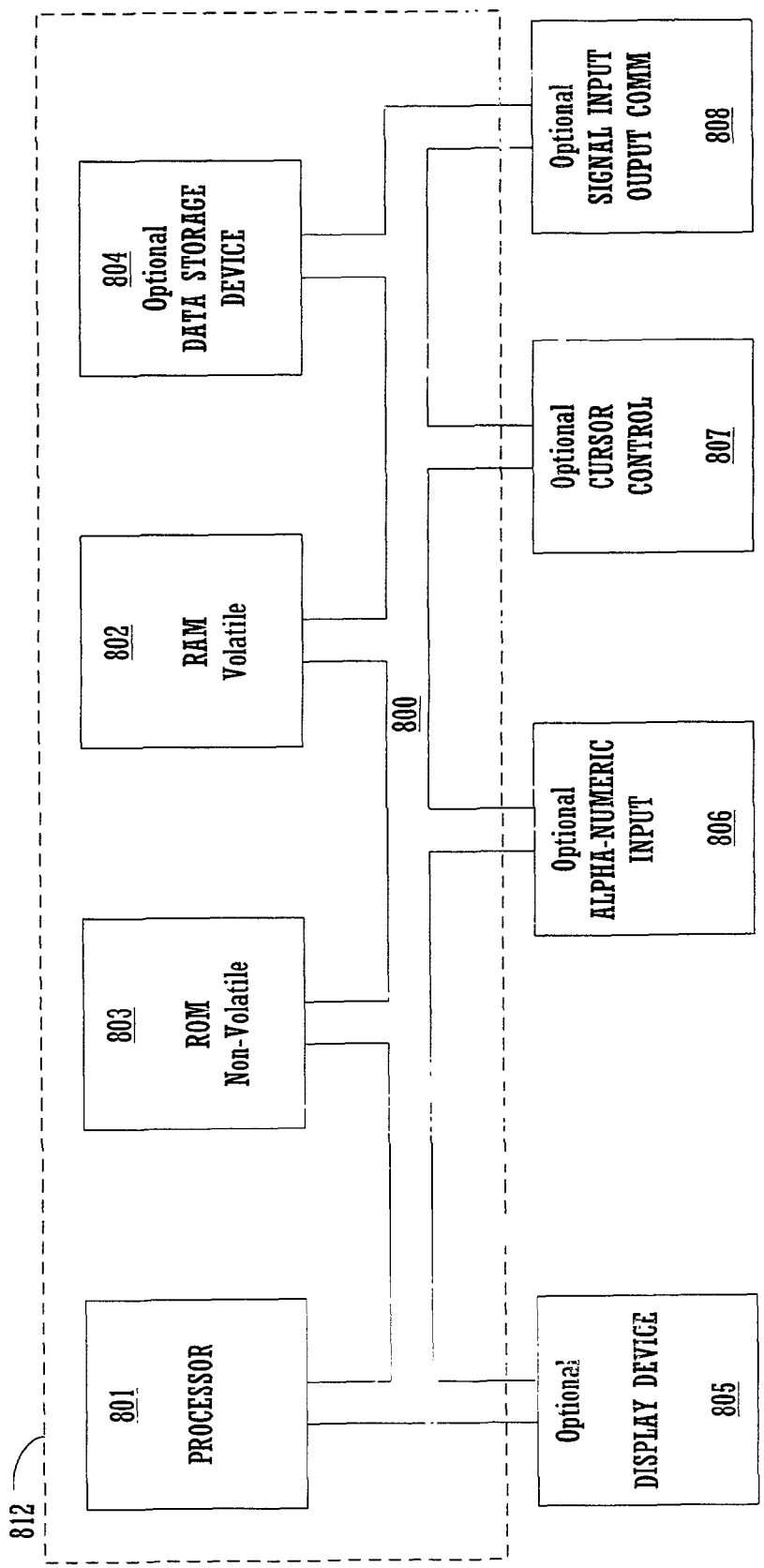
FIG. 8 shows the components of a computer system in accordance with one embodiment of the present invention.

With reference now to FIG. 8, a computer system 812 in accordance with one embodiment of the present invention is shown. Computer system 812 shows the components of a computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within computer readable memory units of a computer system (e.g., system 812) and are executed by the processor(s) of system 812. When executed, the instructions cause the computer system 812 to implement the functionality of the present invention as described above.

In general, computer system 812 shows the basic components of a computer system used to implement "server" machines and "client" machines. Computer system 812 comprises an address/data bus 800 for communicating information, one or more central processors 801 coupled with the bus 800 for processing information and instructions, a computer readable volatile memory unit 802 (e.g., random access memory, static RAM, dynamic, RAM, etc.) coupled with the bus 800 for storing information and instructions for the central processor(s) 801, a computer readable non-volatile memory unit (e.g., read only memory, programmable ROM, flash memory, EPROM, EEPROM, etc.) coupled with the bus 800 for storing static information and instructions for the processor(s) 801. System 812 also includes a mass storage computer readable data storage device 804 such as a magnetic or optical disk and disk drive coupled with the bus 800 for storing information and instructions. Optionally, system 812 can include a display device 805 coupled to the bus 800 for displaying information to the computer user, an alphanumeric input device 806 including alphanumeric and function keys coupled to the bus 800 for communicating information and command selections to the central processor(s) 801, a cursor control device 807 coupled to the bus for communicating user input information and command selections to the central processor(s) 801, and a signal generating device 808 coupled to the bus 800 for communicating command selections to the processor(s) 801.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for automated accessibility checking of Web pages, comprising:
   accessing HTML code of a Web page using a parser to generate data corresponding to the components of the Web page by performing a plurality of analysis passes on the components of the Web page to generate data corresponding to the components of the Web page and a hierarchy of components, and based on the generated hierarchy, generate a hierarchical tree data structure corresponding to the components of the Web page, wherein the plurality of passes comprise at least a first pass and a second pass, and wherein the first pass is configured to break down complex components of the Web page into basic components and the second pass is configured to break down basic components of the Web page into a data stream of the Web page;
   sending the data corresponding to the components of the Web page, the data stream of the Web page, and the generated hierarchy to an analyzer;
   analyzing, by the analyzer, the data stream of the Web page, the data corresponding to the components of the Web page, and the hierarchical tree structure using an analysis engine to determine compliance of each of the components of the Web page with a set of accessibility standards;
   storing a result of the analysis engine, wherein the result comprises an aggregated result of the analysis of the components providing the aggregated result and indicating a degree of compliance with the set of accessibility standards including an indication of which standards were violated and where each violation occurred in specific locations in the HTML code of the Web page, and providing a link to the specific locations in the HTML code where each violation occurred;
   receiving a selection of at least one of the links to the specific locations within the HTML, and in response to the selection, displaying the point directly within the HTML code which leads to the violation;
   providing explanations as to reasons the locations within the HTML code violate the standards; and
   providing examples of HTML code corrections or changes to be made in order to remedy the HTML code which violates the standards.

2. The method of claim 1 further comprising:
   generating a result presentation indicating the degree of compliance with the set of accessibility standards; and
   providing the result presentation to a Web client.

3. The method of claim 1 wherein the result of the analysis engine is stored within a database.

4. The method of claim 1 wherein the method for automated accessibility checking is a hosted application residing on a server.

5. The method of claim 1 wherein the parser is configured to automatically access a plurality of Web pages of a Web site.

6. A system for automated accessibility checking of Web pages, comprising:
   a computer system having a processor coupled to a memory, the memory having computer readable code which when executed by the processor causes the computer system to implement:
   a parser for accessing HTML code of a Web page to generate data corresponding to the components of the Web page by performing a plurality of analysis passes on the components of the Web page to generate data corresponding to the components of the Web page and a hierarchy of components, based on the generated hierarchy, generate a hierarchical tree data structure corresponding to the components of the Web page, wherein the plurality of passes comprise at least a first pass and a second pass, and wherein the first pass is configured to break down complex components of the Web page into basic components and the second pass is configured to break down basic components of the Web page into a data stream of the Web page, and sending the data corresponding to the components of the Web page, the stream of the Web page, and the generated hierarchy to an analysis engine;
   the analysis engine for analyzing the data stream of the Web page, the data corresponding to the components of the Web page, and the hierarchical tree structure to determine compliance of each of the components of the Web page with a set of accessibility standards;
   a database for storing a result of the analysis engine; and
   a result visualizer for providing the result, wherein the result comprises an aggregated result of the analysis of the components, indicating a degree of compliance with the set of accessibility standards including an indication of which standards were violated and where each violation occurred in specific locations in the HTML code of the Web page, providing a link to the specific locations in the HTML code where each violation occurred, receiving a selection of at least one of the links to the specific locations within the HTML, and in response to the selection, displaying the point directly within the HTML code which leads to the violation, providing explanations as to reasons the locations within the HTML code violate the standards, and providing examples of HTML code corrections or changes to be made in order to remedy the HTML code which violates the standards.

7. The system of claim 6 wherein the result visualizer is configured to generate a result presentation indicating the degree of compliance with the set of accessibility standards and provide the result presentation to a Web client.

8. The system of claim 6 wherein the computer system is a server computer system.

9. The system of claim 6 wherein the parser is configured to automatically access a plurality of Web pages of a Web site.

* * * * *

UNITED STATES PATENT AND TRADEMARK OFFICE
CERTIFICATE OF CORRECTION

PATENT NO.        : 8,090,800 B2                                        Page 1 of 1
APPLICATION NO.   : 10/146099
DATED             : January 3, 2012
INVENTOR(S)       : Yee It is certified that error appears in the above-identified patent and that said Letters Patent is hereby corrected as shown below:

On sheet 5 of 8, in figure 5, Reference Numeral 102, line 2, delete "ACCESIBLE" and insert -- ACCESSIBLE --, therefor.

On sheet 6 of 8, in figure 6, Reference Numeral 102, line 2, delete "ACCESIBLE" and insert -- ACCESSIBLE --, therefor.

On sheet 7 of 8, in figure 7, Reference Numeral 102, line 2, delete "ACCESIBLE" and insert -- ACCESSIBLE --, therefor.

On sheet 8 of 8, in figure 8, Box No. 808, line 3, delete "OUPUT" and insert -- OUTPUT --, therefor.

In column 3, line 43, after "database" insert -- . --.

In column 4, line 34, after "below" insert -- . --.

In column 7, line 29, after "can be" delete "can".

In column 8, line 32, delete "datastream," and insert -- data stream, --, therefor.

In column 10, line 21, delete "hyper link)" and insert -- hyperlink) --, therefor.

Signed and Sealed this
Twenty-seventh Day of March, 2012

David J. Kappos
*Director of the United States Patent and Trademark Office*